UNITED STATES PATENT OFFICE.

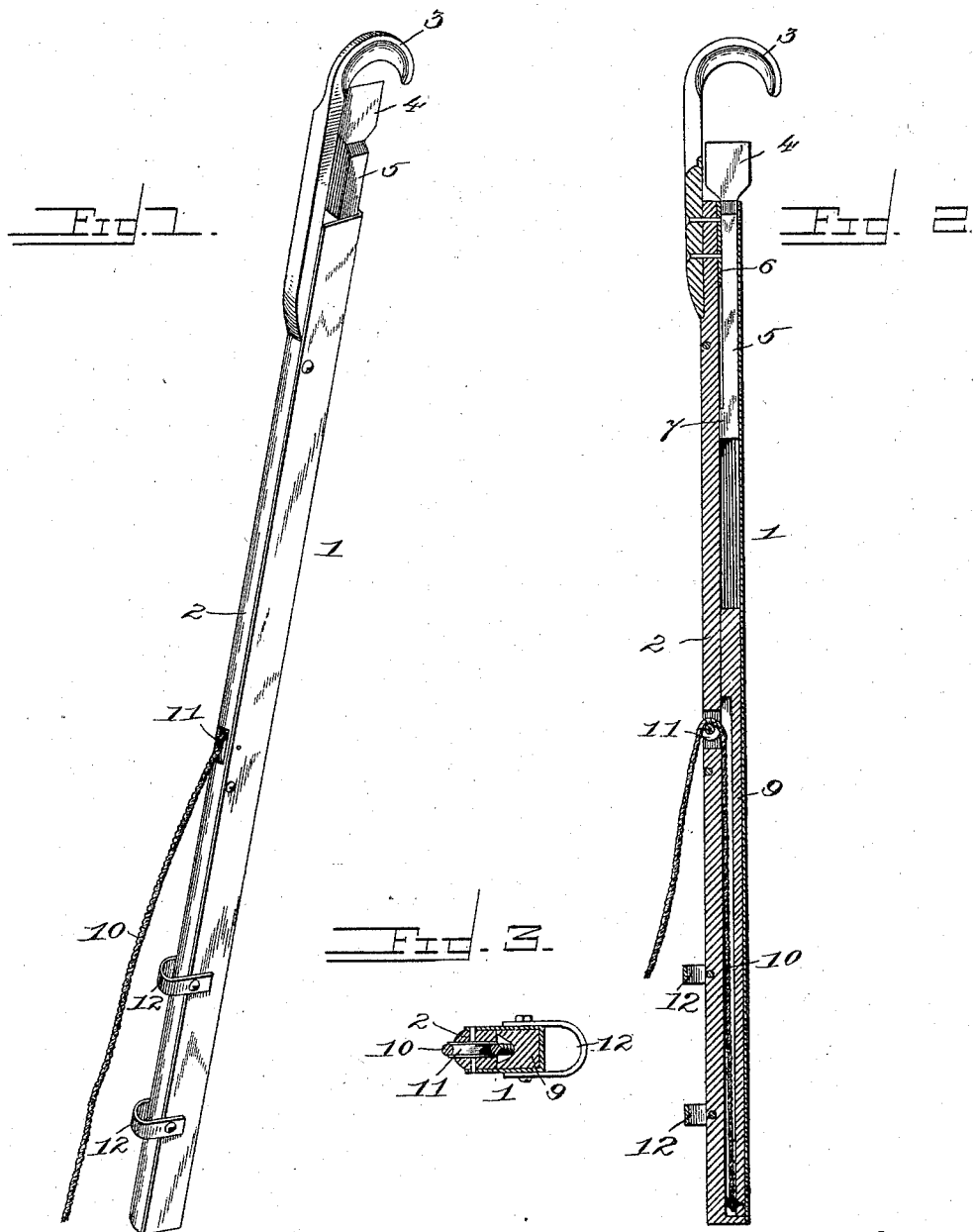

GEORGE G. LANG, OF KENDALLVILLE, INDIANA.

PRUNING IMPLEMENT.

SPECIFICATION forming part of Letters Patent No. 580,321, dated April 6, 1897.

Application filed April 30, 1896. Serial No. 589,698. (No model.)

*To all whom it may concern:*

Be it known that I, GEORGE G. LANG, a citizen of the United States, residing at Kendallville, in the county of Noble and State of Indiana, have invented a new and useful Pruning Implement, of which the following is a specification.

The invention relates to improvements in pruning implements.

The object of the present invention is to improve the construction of pruning implements, and to provide a simple, inexpensive, and efficient one capable of convenient operation and adapted to readily engage the limbs of trees and rapidly sever the same.

A further object of the invention is to provide a pruning implement which will be especially adapted for cutting the larger limbs of a tree, and which will enable a series of successive blows to be directed by the knife without withdrawing the same from the cut.

The invention consists in the construction and novel combination and arrangement of parts hereinafter fully described, illustrated in the accompanying drawings, and pointed out in the claim hereto appended.

In the drawings, Figure 1 is a perspective view of a pruning implement constructed in accordance with this invention. Fig. 2 is a longitudinal sectional view. Fig. 3 is a transverse sectional view.

Like numerals of reference designate corresponding parts in all the figures of the drawings.

1 designates a hollow pole or stem of any desired length, preferably consisting of a sheet-metal casing and a strip 2, arranged at the back of the same, and the sheet-metal casing is rectangular in cross-section.

At the upper end of the pole or stem is mounted a hook 3, adapted to engage a limb and provided at its engaging portion with a cutting edge to assist in severing a limb, and the shank of the hook is secured to the back strip 2 by suitable fastening devices, the engaging portion of the hooks being located beyond the pole or stem, as shown.

A reciprocating knife 4 coöperates with the cutting edge of the hook and is provided with a shank 5, slidingly mounted in the upper portion of the tubular stem or pole and having its outward movement limited by a stop 6, consisting of a plate secured to the back strip by the fastening devices of the shank of the hook 3 and arranged to engage a lug 7, preferably formed integral with the shank of the knife and located at the inner or lower end of the same. The reciprocating knife is operated by a plunger 9, slidingly mounted within the tubular pole or stem and connected with an operating-cord 10, which passes over a pulley 11. The lower end of the plunger is normally located a considerable distance below the pulley, which is mounted in a slot or opening of the back strip 2, and the operating-cord extends upward from the lower end of the plunger and passes outward through the slot or opening of the back strip, and when the operating-cord is suddenly pulled downward the plunger is thrown upward, carrying with it the knife 4. When one blow is insufficient to sever a limb of considerable size, a series of successive blows may be delivered on the shank of the knife or blade without withdrawing the latter from the cut of the limb. By this construction large limbs may be successively operated on and quickly severed from trees.

The hollow pole or stem 1, which may be of any length, is provided with a pair of loops 12, adapted to receive a pole for forming an extension of the pole or stem 1.

It will be seen that the pruning implement is simple and comparatively inexpensive in construction, that it is positive and reliable in operation, and that it is capable of enabling a series of successive blows to be delivered upon a limb without withdrawing the knife from the cut, so that large limbs may be successively operated on and rapidly severed from a tree.

Changes in the form, proportion, and minor details of construction may be resorted to without departing from the principle or sacrificing any of the advantages of this invention.

What I claim is—

In a device of the class described, the combination of a hollow pole provided at its top with a stop, a hook mounted on the pole, a reciprocating knife coöperating with the hook and provided with a shank slidingly arranged in the upper portion of the pole and having a lug at its inner end for engaging said stop to limit the outward movement of the knife, said knife being adapted to slide freely inward and outward on the pole and capable of engaging a limb, and of remaining in contact therewith until the same is severed, a pulley mounted in an opening of the pole, an operating-cord arranged on the pulley and passing into the pole, and a reciprocating plunger provided with a longitudinal groove to receive the cord, connected at its lower end to the same and adapted to deliver a series of successive blows upon the shank of the knife without the latter leaving a limb, substantially as described.

In testimony that I claim the foregoing as my own I have hereto affixed my signature in the presence of two witnesses.

GEORGE G. LANG.

Witnesses:
THOMAS L. GRAVES,
FRED L. BLUHM.